Sept. 14, 1926.                                                                1,599,846
                              I. L. SINCLAIR ET AL
                    LOW PRESSURE ALARM FOR VEHICLE TIRES
                             Filed Oct. 23, 1925
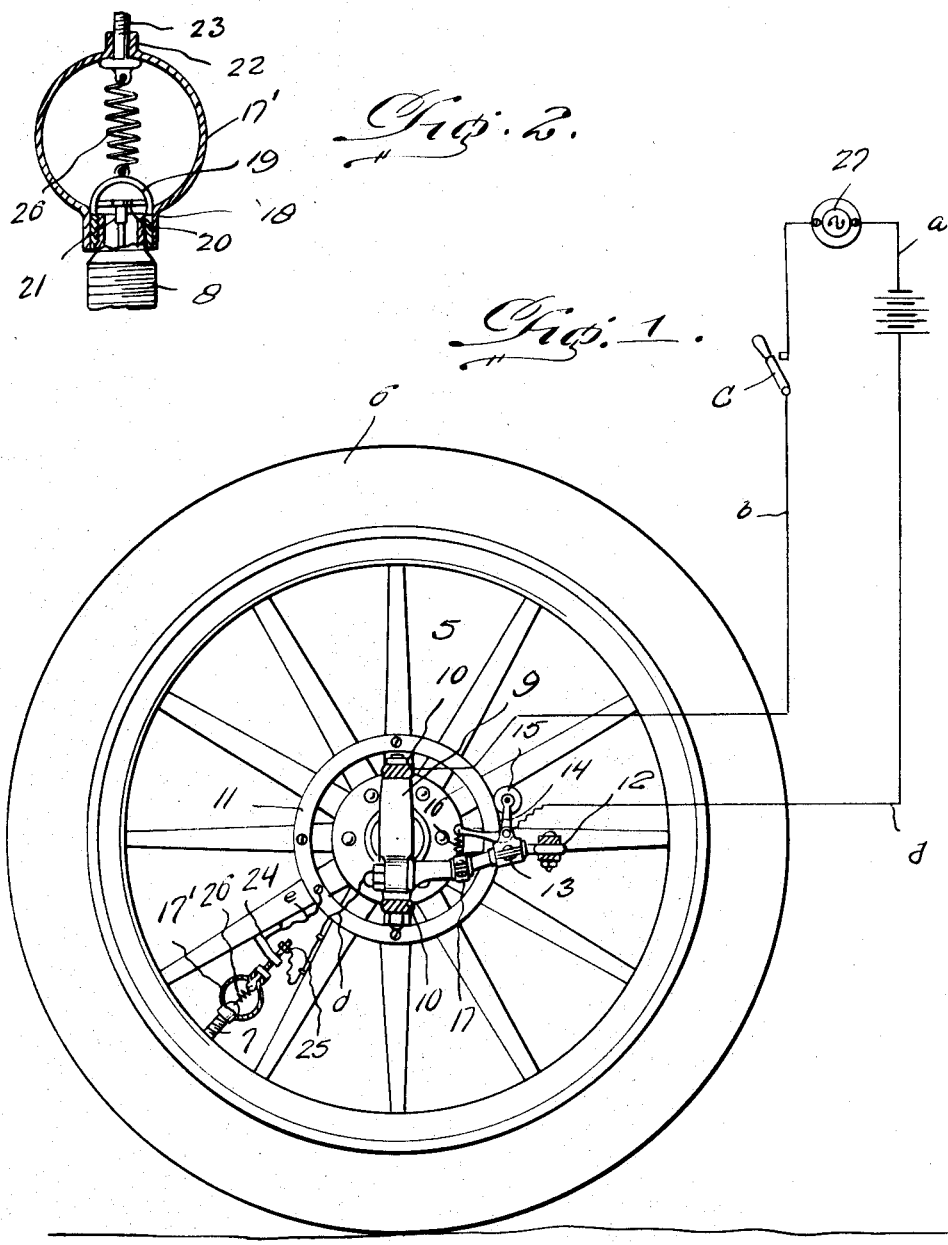
Inventor,
F. J. Sinclair,
I. L. Sinclair,
By Clarence A. O'Brien
                Attorney Patented Sept. 14, 1926.

1,599,846

UNITED STATES PATENT OFFICE.

ISAAC L. SINCLAIR AND FORREST J. SINCLAIR, OF MURPHY, OREGON.

LOW-PRESSURE ALARM FOR VEHICLE TIRES.

Application filed October 23, 1925. Serial No. 64,402.

This invention relates to vehicle alarms and has particular reference to a means whereby the driver of a vehicle may ascertain when the pressure in his tire reaches a predetermined low level during the operation of the vehicle and without the necessity of paying any attention to the tire, the alarm being entirely automatic in its nature and of such simple construction as to operate properly and efficiently under all conditions.

The primary object of the invention is to substantially improve and simplify previously patented devices for obtaining this result.

An additional object of the invention is to provide an alarm that comprises means associated with each particular vehicle wheel and tire for automatically completing a circuit to an indicator that is preferably arranged upon the instrument board of the vehicle in order that the operator will readily recognize the indicator when the same is in operation.

A further and important object is to provide means whereby the mechanism may be said to operate at various low pressures of the tires.

Other objects will become apparent as the nature of the invention is better understood from the following specification considered in conjunction with the accompanying drawings.

In the drawing wherein like reference characters designate corresponding parts throughout both the views:—

Figure 1 is an inside view of a vehicle front wheel, portions of its complementary supporting mechanism being shown in cross section, and with which is associated the mechanical elements of the present invention, which are shown partly in elevation and partly in section, of the indicating means per se which is of an electrical nature, being shown in diagram, and Fig. 2 is an enlarged detail section through the tire pressure control construction of the present invention.

In the drawing, we have shown our automatic pressure alarm as being associated with one of the front wheels of a vehicle, it nevertheless being understood that through minor changes the device may be associated with the rear wheels and in fact it is to be understood that the mechanism of the general character as herein shown and described is to be associated with each of the wheels of a vehicle in order that an alarm will be sounded when the pressure in the tires of the four wheels reaches a predetermined low level.

In the drawings, 5 is a conventional form of vehicle wheel with which is associated the usual pneumatic tire 6, the tube of which carries the usual air inflating valve that comprises a threaded stem 7 in which is the valve mechanism 8, Fig. 2.

As is well known, the wheel 5 is mounted for rotation upon the usual spindle of a spindle body 9 that is mounted between the forked ends 10—10 of the usual axle, not shown.

Our invention, per se, constitutes the provision of an electrical conducting ring 11 that is bolted or otherwise suitably secured to the spokes of the wheel 5 in concentric relation with the hub thereof and upon the interior side of the said wheel. In association with the rear end of the usual spindle arm 12 of the wheel steering mechanism and insulated therefrom is a two-part clamp 13, to the upper section of which is pivotally mounted a bell crank 14, the inner arm of which carries an electrical contact roller 15 that is maintained in rolling contact with the ring 11 through the medium of a contractile spring 16 connected at one end to said arm and at its opposite end to a clamp 17 that is also secured to and insulated from the spindle arm 12 forwardly of the first mentioned clamp 13.

Our alarm further includes an air receiving bulb 17' that is of collapsible nonstretchable material that is air impervious such as rubberized fabric or the like. Said bulb 17' is formed with an air inlet nipple 18, which has partially disposed therein in an airtight manner, a metal cap 19, the open end of which is internally threaded for threaded relation with the tire valve stem 7. This cap 19 is formed internally with a cross web 20 dependent from the center of which is a pin 21 that engages the usual valve stem of the valve mechanism within the stem 7 when the cap 19 is threaded thereon for obviously releasing the valve and for allowing the air to enter the bulb 17.

In diametrically opposed relation with the nipple 18, is a nipple 22 through which extends the eye end of a relatively thin eyebolt 23, the threaded end of which is guided through an opening in a contact bracket 24 that is secured to an adjacent spoke of the wheel 5.

At this point it may be well to note that the cap 19 and eyebolt 23 may be secured within the nipples of the bulb through the medium of cement or the like to prevent the passage of the air between the walls of the nipple and said cap and eyebolt, and further that the top wall of said cap is provided with a plurality of openings to enable the air from the tire to pass into the bulb 17 which is necessary to the successful operation of the device.

Mounted for threaded adjustment in the bolt 23 at its outer end is an electric contact member 25, while normally maintaining the bulb 17′ flat and consequently the member 25 in contact with the member 24 is a contractile coiled spring 26 within said bulb and secured at its opposite ends to the eyed end of the bolt and the cap 23 and 19 respectively. Obviously, the pressure within the tire 6 is normally such as to expand the bulb 17 which will force the eyebolt outwardly through the opening the bracket 24 for maintaining the contact member 25 out of engagement therewith.

Our improved alarm further constitutes the provision of an electric bulb 27 that is preferably mounted upon the instrument board of the vehicle and that has electrical connection at one point as at $a$ with one pole of the vehicle storage battery X and at its other points with the upper finger of the axle fork 10 as at $b$, within which connection may be disposed a conventional switch $c$.

The other battery has electrical connection as at $d$ with the bell crank 14, while the contact bracket 24 has electrical connection as at $e$ with the contact ring 11 and in addition thereto, the contact member 25 is electrically connected with a metal portion of the wheel 5 as at $d$ which metal portion through other metallic elements of the wheel, spindle body, axle and the like, is in continuous circuit with the vehicle axle which is electrically connected to the bulb 27 as previously mentioned at $b$.

The operation of the device will be readily apparent:

At the normal pressure of the tire 6, the bulb 17 will be inflated and consequently the contacts 24 and 25 will be out of engagement. During the reduction of pressure within the tire the spring 26 will tend to collapse the bulb 17 and at a certain low pressure the contacts 24 and 25 will be brought into engagement for completing the circuit to the bulb 27 when the switch $c$ is closed at which time the bulb will become illuminated for readily indicating to the operator that the particular tire of the vehicle is at a lower pressure and needs immediate attention. The re-inflation of the tire will inflate the bulb 17 and so move the bolt 23 as to disengage the contact 25 from the contact bracket 24.

Minor changes may be made in the invention without departing from the spirit and scope of the appended claim.

Having thus described our invention, what we claim as new and desire to secure by Letters Patent is:—

A circuit making and breaking device adapted for use in connection with the air valve of a pneumatic tire, said device comprising a collapsible air receiving bag, a cap arranged in the bottom of the bag and being adapted to be threaded on the upper end of the threaded valve stem of the pneumatic tire, the top of said cap being provided with openings whereby communication between the air valve and the bag is provided, a depending pin carried by the cap and adapted for engagement with the valve stem whereby the latter is held depressed to permit the air to escape from the tire into said bag, a stationary contact supported in spaced relation with respect to the top of said bag, a coacting contact extending through the top of the bag, and a contractile coil spring arranged within the bag and secured at its opposite ends to the cap and the contact respectively, said contacts being normally held in an inoperative position and the contractile coil spring expanded, the contacts being adapted to be disposed in an operative position when the air pressure in the bag reaches a predetermined level, and the bag is collapsed by the action of the coil spring.

In testimony whereof we affix our signatures.

ISAAC L. SINCLAIR.
FORREST J. SINCLAIR.